(12) United States Patent
Jabri et al.

(10) Patent No.: US 7,672,322 B2
(45) Date of Patent: *Mar. 2, 2010

(54) METHODS AND SYSTEM FOR FAST SESSION ESTABLISHMENT BETWEEN EQUIPMENT USING H.324 AND RELATED TELECOMMUNICATIONS PROTOCOLS

(75) Inventors: Marwan A. Jabri, Tiburon, CA (US); Craig Southeren, Holgate (AU); Robert Jongbloed, Rozelle (AU); David Jack, Glebe (AU); David Myers, Glebe (AU); Albert Wong, Rohnert Park, CA (US)

(73) Assignee: RPX Corporation, San Francisco, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/608,209

(22) Filed: Dec. 7, 2006

(65) Prior Publication Data

US 2007/0086583 A1    Apr. 19, 2007

Related U.S. Application Data

(63) Continuation of application No. 11/373,413, filed on Mar. 10, 2006, now Pat. No. 7,161,949, which is a continuation of application No. 10/732,917, filed on Dec. 9, 2003, now Pat. No. 7,139,279.

(60) Provisional application No. 60/433,252, filed on Dec. 12, 2002.

(51) Int. Cl.
*H04L 12/28* (2006.01)
*H04L 12/56* (2006.01)

(52) U.S. Cl. .................... 370/410; 370/392

(58) Field of Classification Search ............ 370/389, 370/392, 410
See application file for complete search history.

(56) References Cited

U.S. PATENT DOCUMENTS 5,694,457 A    12/1997   Nixon et al.

(Continued)

FOREIGN PATENT DOCUMENTS

EP    1202522 A2    5/2002

(Continued)

OTHER PUBLICATIONS

Han, et al., Dept. of Computer Engineering and Information Technology, Design and Implementation of 3G-324M—An Event-Driven Approach, Vehicular Technology Conference, 2004, Sep. 26-29, 2004, pp. 2108-2112.

(Continued)

*Primary Examiner*—Ronald Abelson
(74) *Attorney, Agent, or Firm*—Townsend and Townsend and Crew LLP

(57) ABSTRACT

Methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to (i) a method and apparatus for concatenating the H.245 messages that are required to pass between the terminals at the start of the call to establish the capabilities of both terminals and agree on the type and format of media and data to be exchanged (ii) a method and apparatus for using non-standard H.245 messages or standard H.245 messages with non-standard fields to accelerate such establishment and (iii) a method and apparatus of informing each terminal of the capabilities of the other and proposing the type and format of media and data to be exchanged by means of any user-defined fields that are inserted in the call signaling protocol that is used for bearer establishment prior to the start of the H.324 stage of the call.

47 Claims, 10 Drawing Sheets

U.S. PATENT DOCUMENTS

| | | |
|---|---|---|
| 6,219,662 B1 | 4/2001 | Fuh et al. |
| 6,384,853 B1 | 5/2002 | Shaffer et al. |
| 6,404,802 B1 | 6/2002 | Kang et al. |
| 6,636,745 B2 | 10/2003 | Oprescu-Surcobe et al. |
| 6,694,471 B1 | 2/2004 | Sharp |
| 6,754,228 B1 | 6/2004 | Ludwig |
| 6,810,035 B1 | 10/2004 | Knuutila et al. |
| 6,909,708 B1 | 6/2005 | Krishnaswamy et al. |
| 6,922,731 B1 | 7/2005 | Morioka et al. |
| 6,987,974 B1 | 1/2006 | Mostafa et al. |
| 7,031,279 B2 | 4/2006 | Lee et al. |
| 7,139,279 B2 | 11/2006 | Jabri et al. |
| 7,161,949 B2 * | 1/2007 | Jabri et al. .................. 370/410 |
| 7,206,316 B2 | 4/2007 | Jabri et al. |
| 7,227,873 B2 | 6/2007 | Lehtimaki |
| 2002/0114272 A1 | 8/2002 | Stewart |
| 2003/0202487 A1 | 10/2003 | Harris |
| 2004/0028037 A1 | 2/2004 | Rasanen et al. |
| 2004/1007614 | 4/2004 | Kauhanen et al. |
| 2004/0158647 A1 | 8/2004 | Omura |
| 2005/0193420 A1 | 9/2005 | Hocevar et al. |

FOREIGN PATENT DOCUMENTS

| | | |
|---|---|---|
| JP | 2003-169164 A | 6/2003 |
| WO | WO 00/51387 | 8/2000 |
| WO | WO 00/76107 A2 | 12/2000 |
| WO | WO 01/37606 A2 | 5/2001 |
| WO | WO 01/76288 A1 | 10/2001 |
| WO | WO 02/052825 A1 | 7/2002 |
| WO | WO 02/071721 | 9/2002 |
| WO | WO 2004/054221 A1 | 6/2004 |
| WO | WO 2005/055556 | 6/2005 |
| WO | WO 2006/020031 A2 | 2/2006 |
| WO | WO 2006/020031 A3 | 2/2006 |

OTHER PUBLICATIONS

ITU Study Group 16, Series H: Audiovisual and Multimedia Systems: Infrastructure of Audiovisual services—Systems and terminal equipment for audiovisual services, H.324 Terminal for low bit-rate multimedia communication, Feb. 1998, pp. 1-50.

ITU Study Group 16, Series H: Audiovisual and Multimedia Systems: Infrastructure of Audiovisual services—Systems and terminal equipment for audiovisual services, H.460.6 Extended Fast Connect Feature, Oct. 2002, pp. 1-17, Retrieved from the Internet <<http://ftp3.itu.int/av-arch/avc-site/2001-2004/0210_Gen/h460-6plan.zip>> on Dec. 9, 2005.

ITU-T Recommendation H.245, Series H: Audiovisual and Multimedia Systems: Infrastructure of Audiovisual Services Procedures, Control Protocol for Multimedia Communication, International Telecommunication Union, Sep. 1998, pp. 1-273.

Jabri, the 30-324M Protocol for Conversational Video Telephony, IEEE Computer Society, 2004, pp. 102-105.

Lee et al., An Implementation of Control Protocol for Multipoint Audio-Video Teleconferencing Systems, Distributed Multimedia Section, ETRI, Taejon, Korea, 4 pages.

Lindbergh, PictureTel Corporation, The H.324 multimedia communication standard, Communications Magazine, IEEE, vol. 34, Issue 12, Publication Date: Dec. 1996, pp. 46-51.

Wen et al., Implement of System Control Part in a Multimedia Communication Terminal, State Key Laboratory on Mircrowave & Digital Communications, pp. 1372-1375.

European Search Report of PCT Application EP 07 00 6646, dated Aug. 3, 2007, 2 pages total.

"Terminal for Low Bit-Rate Multimedia Communication"; International Communication; Mar. 29, 2002; p. 1-66; Geneva; CH.

European Search Report for Application No. 09151262.4; mailed on Apr. 14, 2009; pp. 8.

Non-Final Office for U.S. Appl. No. 11/560,963; mailed on Feb. 24, 2009; pp. 7.

* cited by examiner

* Note that if the mediaWaitForConnect is set to TRUE in the Setup message then the media is not transmitted until after the Connect message is sent.

```
Type2Request ::= SEQUENCE
{
    version INTEGER (1..255),
    license INTEGER (1..MAX),
    terminalType    INTEGER (0..255), -- For MSD
    multiplexEntryDescriptors SET SIZE (1..15) OF
                    MultiplexEntryDescriptor OPTIONAL, -- MTE
    ...
}
```

Figure 6

```
Type2Response ::= SEQUENCE
{
    sequenceNumber  SequenceNumber, version INTEGER (1..255),
    license INTEGER (1..MAX), decision    CHOICE  -- MSD result based on "terminalType" compare
    {                   -- if terminalType is the same then caller
        master  NULL,   -- is always the master
        slave   NULL
    }, multiplexTableEntryNumber SET SIZE (1..15) OF
                            MultiplexTableEntryNumber OPTIONAL, logicalChannels SEQUENCE OF OpenLogicalChannel,

```
Type3Setup ::= SEQUENCE
{
    version     INTEGER (1..255),
    license     INTEGER (1..MAX),
    terminalType INTEGER (0..255), -- For MSD
    profiles    SEQUENCE (1..30) OF INTEGER (0..65535),
    mediaWaitForConnect BOOLEAN,
    ...
}
```

Figure 8

```
Type3Connect ::= SEQUENCE
{
    version INTEGER (1..255),
    license INTEGER (1..MAX),
    decision    CHOICE   -- MSD result based on "terminalType" compare
    {                    -- if terminalType is the same then caller
        master  NULL,    -- is always the master
        slave   NULL
    },
    profile INTEGER (0..65535),
    ...
}
```

Figure 9

Profile 0
   Mobile Level 2
   G.723.1 Audio on LCN1
   MUX table 1={LCN1,RC,UCF}
Profile 1
   Mobile Level 2
   GSM-AMR Audio on LCN1
   MUX table 1={LCN1,RC,UCF}, 2={LCN2,RC,UCF}
Profile 2
   Mobile Level 2
   G.723.1 Audio on LCN1
   H.263 QCIF Video on LCN2
   MUX table 1={LCN1,RC,UCF}, 2={LCN2,RC,UCF}
Profile 3
   Mobile Level 2
   GSM-AMR Audio on LCN1
   H.263 QCIF Video on LCN2
   MUX table 1={LCN1,RC,UCF}, 2={LCN2,RC,UCF}
Profile 4
   Mobile Level 2
   GSM-AMR Audio on LCN1
   MPEG4 QCIF Video on LCN2
   MUX table 1={LCN1,RC,UCF}, 2={LCN2,RC,UCF}

Figure 10

METHODS AND SYSTEM FOR FAST SESSION ESTABLISHMENT BETWEEN EQUIPMENT USING H.324 AND RELATED TELECOMMUNICATIONS PROTOCOLS

CROSS-REFERENCES TO RELATED APPLICATIONS

This application is a continuation of U.S. patent application Ser. No. 11/373,413, filed Mar. 10, 2006; which is a continuation of U.S. patent application Ser. No. 10/732,917, filed Dec. 9, 2003, now U.S. Pat. No. 7,139,279; which claims priority to U.S. Provisional No. 60/433,252, filed Dec. 12, 2002, all of which are incorporated by reference herein.

COPYRIGHT NOTICE

A portion of this application contains computer codes, which are owned by Dilithium Networks Pty Ltd. All rights have been preserved under the copyright protection, Dilithium Networks Pty Ltd.®2003.

BACKGROUND OF THE INVENTION

The present invention relates generally to methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

H.324 is an International Telecommunication Union (ITU) protocol standard for multimedia communication over general switched networks (GSTN). H.324M is an extension of H.324 for operations over mobile networks, and 3G-324M is a recommendation by the third generation partnership program (3GPP) defining adaptation of H.324M for use within 3GPP and also adopted by 3GPP2. We call H.324-like equipment devices and systems employing protocol based or derived from H.324. H.324-like equipment can connect to other H.324-like equipment via switching centers and to other non-H.324-like equipment through multimedia gateways. An example of a non-H.324-like equipment is an H.323 equipment. H.323 is an International Telecommunication Union protocol Standard for multimedia communication over non-guaranteed bandwidth packet networks. An H.323-like equipment is an equipment that employs a protocol based or derived from the H.323 protocol.

Without any loss of generality, we will use the term "H.324" to indicate H.324-like equipment including H.324M and 3G-324M equipment and "H.323" to indicate H.323-like equipment.

Also without any loss of generality we use the term "equipment" to indicate either a user end equipment such as a handset, or network end equipment such as a switch or gateway. We also use the terms "equipment" and "terminal" interchangeably, and they both indicate the same meaning in the present document.

If a call is made between equipments which are an embodiment of the H.324, H.324M or 3G-324M, the first stage of the call is to establish an end-to-end bearer between the equipments. This stage is called Call Signaling and is outside the scope of H.324, except where modems and the General Switched Telephony Network are used. The second stage of the call is to establish the H.324 session, to provide a means of transporting video, audio and data between the equipments in a format that is known to, and supported by the equipments. In order to do this H.324M makes use of two further ITU-T Recommendations.

The first of these Recommendations used is H.223 "Multiplexing protocol for low bit rate multimedia communication". H.223 specifies a frame-oriented multiplexing protocol which allows the transfer of any combination of digital voice, video and data (e.g. command and control) information over a single communication link. The H.223 may have a number of modes of operation, specified in Annexes A, B and C of the H.223 Recommendation that are intended to provide increased resilience in the presence of errors. These are also known as Mobile Levels 1, 2 and 3. H.223 without the application of any of these Annexes is also sometimes referred to as operating at Mobile Level 0 (base-line). H.324 has the concept of Logical Channels which is a way of providing virtual channels over the circuit switched link. The role of the multiplexer is to combine (multiplex) parts of the data chunks written on the logical channels into frames known as a Multiplexer Protocol Data Unit (MUX-PDU). Logical Channel 0 is always available and is used for Command and Control. Data (voice, video, command and control and other general data) is passed to/from the H.223 multiplexer through bitstream chunks called service data units (SDUs). Before being multiplexed, these different SDUs go through Adaptation Layers where extra information may be added for purposes such as error detection, sequence numbering and retransmission requests.

The second of these Recommendations is H.245 "Control protocol for multimedia communication" which specifies the syntax and semantics of terminal information messages as well as procedures to use them for in-band negotiation at the start of or during communication. The messages cover receiving and transmitting capabilities and preferences, logical channel signaling and control and indication. The messages that are specified in H.245 are expressed in the ITU-T Abstract Syntax Notation (ASN.1) and can be classified as of Request, Response, Command or Indication type. H.245 messages are encoded according to the ASN.1 standard before being transmitted. When a terminal sends an H.245 message of type Request it requires that an appropriate message of type Response is sent by the remote terminal. If the Response (sometimes referred to as an Ack for Acknowledgement) is not received within a certain time, the sending terminal will re-transmit the Request or take another appropriate action if no response has been received for repeated Requests. Re-transmission of requests may occur a number of times. Many of the H.245 messages associated with call setup are of the Request type.

H.245 also requires a reliable link layer for proper operation. The principal means of providing this, specified in Annex A of H.324, is to use the Simple Retransmission Protocol (SRP) or the Numbered Simple Retransmission Protocol (NSRP), in which one or more H.245 messages, known collectively as a MultimediaSystemControl PDU and in the present document as an H.245 PDU, are formed into SRP Command Frames prior to sending, and the receiving terminal must send an SRP Response Frame (Sometimes referred to as an SRP Ack) to acknowledge correct receipt of an SRP Command Frame. No further H.245 messages may be sent by a terminal until the SRP Ack for the last message has been received.

The combined effect of the requirement to send an H.245 Response message for each H.245 Request Message received, and of the need to receive an SRP Ack for every SRP Command Frame sent means that a single H.245 Request message may take some time to be conveyed successfully. The communication involved in sending an H.245 Request message from one terminal (A) to another (B), and getting an H.245 Response (Ack) message back is shown in FIG. 1A, which also shows the SRP Command Frames (SRP CF) and SRP Response Frames (SRP RF or SRP Ack) involved when single H.245 messages are formed into single SRP Command Frames. The H.324 standard allows for multiple H.245 messages to be concatenated into a single SRP Command Frame; however this capability is often not implemented, in which case such terminals may respond only to the first H.245 message encountered in an SRP Command Frame. In some cases, terminals which do not support this capability may malfunction upon receipt of an SDU containing multiple H.245 requests or responses.

We will refer to the sequence of H.245 Request and Response shown in FIG. 1A as a "round trip" and the time associated with completing it as a "round trip delay".

The key steps involved in setting up and connecting a typical H.324 call are as follows:
1. Call signaling (bearer establishment)—outside the scope of H.324. Normally a modem connection if GSTN, through ISDN, or signaling through mobile switching centers in the mobile case.
2. Mobile level detection (MLD)—Where a common Mobile Level is agreed on between equipments. This step is performed by H.324 equipment that supports mobile extensions such as H.324M and 3G-324M equipment.
3. Terminal Capability Exchange (TCS)—H.245 Messaging
4. Master Slave determination (MSD)—H.245 Messaging
5. Open/Close Logical Channels (OLC)—H.245 Messaging
6. Multiplexer Table Entries Exchange (MTE)—H.245 Messaging Steps (3) to (6) are performed using a sequence of H.245 Request and Response messages as described above and illustrated in FIG. 1A. The full sequence of Request and Response messages involved in an H.324 call is shown in FIG. 1B. Note the order of steps (5) and (6) above can be interchanged. It should be noted that Steps (3) to (6) relate to procedures that are defined by underlying state machines that are also known as Signaling Entities. The relevant signaling entities are:
1. Capability Exchange Signaling Entity (CESE)
2. Master Slave Determination Signaling Entity (MSDSE)
3. Logical Channel Signaling Entity (LCSE)
4. Multiplex Table Signaling Entity (MTSE)

Once these steps have completed, media (video, audio and data) can flow between the terminals. Note the H.245 messages flow on the Logical Channel 0 which as previously described is predefined and carried by the means of the multiplexer predefined Multiplex Table Entry 0. Once other Multiplex Table Entries have been exchanged these can also be used in conjunction with H.245 messages.

The key steps above are often handled sequentially; however this results in as many as ten H.245 message round trip delays in order to establish an H.324 session with two logical channels in each direction. In addition, the SRP scheme (or Numbered version—NSRP, in cases where the mobile level is greater than zero) used for H.324/H.245, which requires an SRP message to be received by the endpoint for every message sent, prior to sending any other message, regardless of whether it is associated with the same Signaling Entity or not, further limits the scope to pipeline messages on the network, making call setup slower than if this were not the case. SRP messages are not shown in FIG. 1B.

For H.324M, the Terminal Capabilities Set request (TCS) step described above and shown in FIG. 1B is preceded by a mobile level detection/multiplexer synchronization phase. This consists of each terminal transmitting a repeating pattern of bits (flags) that indicate the highest Mobile Level that it operates at. Each terminal examines the flags that it is receiving. If these flags represent a lower Mobile Level then the terminal drops down to the same lower level. When both terminals are transmitting the same flag sequence this step completes.

Arising from the set of procedures described above that are required to take place to establish an H.324M call, when a call is made from a terminal which is an embodiment of the H.324 it is prone to suffer from long call setup time, which is the interval between the time that the call signaling is initiated to the time that the exchange of voice and video commences between an H324-like end-point (H.324, H.324M or 3G-324M) and other terminals whether H.324-like or not.

The ITU Recommendation H.323 uses H.245 in a similar manner to H.324 for signaling command, control and indication messages related to a call. Unlike H.324, H.323 is equipped with a number of features to speed up the call setup time between H.323 equipment. Similar techniques exist for the IETF Session Initiation Protocol (SIP) protocol.

Thus there exists a need for techniques to speed up the call setup between H.324 like terminals and other terminals either of the H.324 type directly, or terminals such as H.323 via multimedia gateways. The differences between the H.324 protocol (and its extensions such as H.324M and 3G-324M) and H.323 and other protocols mean that additional aspects need to be considered when introducing call establishment speed-up techniques for H.324-like terminals. Such differences include the information about mobile levels where they are used and the messaging and information related to the H.223 multiplexer such as its multiplex table entries, adaptation layers and so on.

SUMMARY OF THE INVENTION

According to the present invention, techniques for telecommunications are provided. More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to (i) a method and apparatus for concatenating the H.245 messages that are required to pass between the terminals at the start of the call to establish the capabilities of both terminals and agree on the type and format of media and data to be exchanged (ii) a method and apparatus for using non-standard H.245 messages, or standard H.245 messages with non-standard fields to accelerate such establishment and (iii) a method and apparatus for informing each terminal of the capabilities of the other and proposing the type and format of media and data to be exchanged by means of any user-defined fields that are available in the call signaling protocol that is used for bearer establishment prior to the start of the H.324 stage of the call.

These methods may be used separately or severally to reduce the time that is taken from the point when a user requests the establishment of a call to the point where media starts to be exchanged between the terminals. Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

According to the present invention, techniques for reducing the number of sequential steps that are required to establish an H.324-like call are provided through a number of methods that may be used separately or severally.

At least three types of methods are described to reduce the number of steps. We call these methods Type I, II, and III, and we number them for ease of reference in the present document. Such methods may be combined or used with conventional techniques depending upon the embodiment. One of ordinary skill in the art would recognize many variations, alternatives, and modifications.

In a specific embodiment, the methods are as follows:
1. Type I: Concatenation of H.245 messages so the number of standard SRP/NSRP command messages is reduced, in order to start media communication.
2. Type II: Incorporation of H.245 Non-Standard messaging capabilities to incorporate information about the equipment involved in the call so the number of H.245 and SRP/NSRP message exchanges are minimized, in order to start media communication.
3. Type III: Incorporation of equipment preferences information in the call signaling protocol exchange as to eliminate the need for further information exchange between the equipment in order to start media communication following call signaling.

In each case the method provides a means to revert to the behavior of a terminal conforming with the H.324 standard.

Type I: Speed-up by Concatenation of H.245 Messages in SRP/NSRP Command Frames

This method exploits the capability to concatenate multiple H.245 messages within a single SRP/NSRP (H.245 PDU) Command Frame as a mean to reduce the number of H.245, SRP/NSRP messages and associated round-trip delays. The H.245 messages have to be concatenated in a way as not to violate dependencies.

The usage of H.245 within H.324 allows equipment to concatenate multiple H.245 elements into a single PDU, thus avoiding the need to use two round trips for each request/response pair due to the need for an SRP/NSRP response to be received for each H.245 PDU before the next PDU is allowed be transmitted.

The method uses concatenated H.245 to send multiple H.245 messages, each originating from different Signaling Entities that have no dependencies on each other, within a single H.245 PDU.

Interoperability with equipment that do not support concatenated H.245 is achieved by noting that such equipment ignore the second and subsequent H.245 elements in a PDU, so will not send any required H.245 Response messages if the ignored message is an H.245 Request message. Therefore the first concatenated H.245 PDU sent should contain at least two Request messages, where the first message must be a Request. If only the Ack for the first message is received, the sending equipment will retransmit those Requests and any other messages that have not been acknowledged, and in doing this and in sending any and all subsequent H.245 messages should revert to sending only a single H.245 message in each subsequent H.245 PDU. If responses to all H.245 messages in the first H.245 PDU are received, the sending equipment can continue to use concatenated messages. The use of this technique will reduce the number of round trip delays if concatenated messages are supported. This method does not define any protocol elements additional to those already allowed and defined by the H.245 and H.324 standards. It can be considered to be utilizing the existing protocols in a smart fashion, rather than an extension to it.

Preferably, the present invention provides a method of initiating a call between users with reduced call set-up times using one or more telecommunication networks. The method is provided between at least a pair of H.324-like terminals coupled to the one or more telecommunication networks. The method includes transmitting a call signaling message from a first terminal to a second terminal through a telecommunication network to initiate a call, establishing a bearer channel between the first terminal and the second terminal once the call signaling message has been received by the second terminal, and determining a common mobile level. Additionally, the method includes determining two or more H.245 messages associated with set up parameters for an initial predetermined mode of operation, concatenating the two or more H.245 messages into one SRP command frame according to a predetermined size of the SRP command frame, and transmitting the SRP command frame including the two or more H.245 messages from the first terminal to the second terminal through a telecommunication network. Moreover, the method includes transmitting an SRP acknowledge message by the second terminal once the SRP command frame has been received by the second terminal, processing at least the two or more H.245 messages during a predetermined time period, and establishing the initial predetermined mode of operation between the first terminal and the second terminal through the bearer channel.

According to another embodiment, the present invention provides a computer-readable medium including instructions for initiating a call between users with reduced call set-up times using one or more telecommunication networks. The computer-readable medium is provided between at least a pair of H.324-like terminals coupled to the one or more telecommunication networks. The computer-readable medium includes one or more instructions for transmitting a call signaling message from a first terminal to a second terminal through a telecommunication network to initiate a call, one or more instructions for establishing a bearer channel between the first terminal and the second terminal once the call signaling message has been received by the second terminal, and one or more instructions for determining a common mobile level. Additionally, the computer-readable medium includes one or more instructions for determining two or more H.245 messages associated with set up parameters for an initial predetermined mode of operation, one or more instructions for concatenating the two or more H.245 messages into one SRP command frame according to a predetermined size of the SRP command frame, and one or more instructions for transmitting the SRP command frame including the two or more H.245 messages from the first terminal to the second terminal through a telecommunication network. Moreover, the computer-readable medium includes one or more instructions for transmitting an SRP acknowledge message by the second terminal once the SRP command frame has been received by the second terminal, one or more instructions for processing at least the two or more H.245 messages during a predetermined time period, and one or more instructions for establishing the initial predetermined mode of operation between the first terminal and the second terminal through the bearer channel.

Type II: Speed-Up Using H.245 Non-Standard Messages

A second method that is the subject of the present invention for reducing the number of sequential steps that are required to establish an H.324-like call proposes the use of Non-Standard messaging capabilities of the H.245 protocol. H.245 allows a number of ways of adding non-standard extensions. There are a number of ways to add non-standard messages in H.245 in order to speed up the call. The most interesting of these is the use of a nonstandard Capability within the H.245 TerminalCapabilitySet message and a NonStandardMessage H.245 Response message. These messages can be used to signal that the calling equipment is capable of operating in a particular way, and to provide proposals and preferences to the remote terminal relating to Master Slave Determination, Logical Channel(s) to be opened and Multiplexer Table Entries embedded within these non-standard extensions to accelerate call set-up. If the remote terminal supports this method, it will signal the calling terminal using a non-standard extension which will also indicate that it accepts, and may also propose modifications or provide other information, including for example the Multiplexer Table Entries that it is using.

If the called terminal does not support this method, it will simply ignore the non-standard extension and not respond with the non-standard response, but a standard response. The call will then proceed as for a standard H.324-like call. The Type II method does not require non-supporting terminals to handle Type I method.

Preferably, the invention provides a method of initiating a call between users with reduced call set-up times using one or more telecommunication networks. The method includes transmitting a call signaling message from a first terminal to a second terminal through a telecommunication network to initiate a call and establishing a bearer channel between the first terminal and the second terminal once the call signaling message has been received by the second terminal. The method also includes determining a common mobile level for operation. The method provides one or more custom Non-Standard H.245 messages or custom Non-Standard fields in standard messages. The one or more custom H.245 messages or custom Non-Standard fields are associated with one or more set up parameters for an initial predetermined mode of operation. Additionally, the method includes transmitting the one or more custom Non-Standard H.245 messages or custom Non-Standard fields in standard messages from the first terminal to the second terminal, transmitting a custom Non-Standard response message associated with the one or more custom Non-Standard H.245 messages or custom Non-Standard fields from the second terminal to the first terminal, and processing the one or more custom H.245 messages or custom Non-Standard fields during a predetermined time period. Moreover, the method includes establishing the initial predetermined mode of operation between the first terminal and the second terminal through the bearer channel based upon at least one or more of the custom H.245 messages or custom Non-Standard fields.

According to another embodiment, the present invention provides a computer-readable medium including instructions for initiating a call between users with reduced call set-up times using one or more telecommunication networks. The computer-readable medium is provided between at least a pair of H.324-like terminals coupled to the one or more telecommunication networks. The computer-readable medium includes one or more instructions for transmitting a call signaling message from a first terminal to a second terminal through a telecommunication network to initiate a call, one or more instructions for establishing a bearer channel between the first terminal and the second terminal once the call signaling message has been received by the second terminal, and one or more instructions for determining a common mobile level for operation. Additionally, the computer-readable medium includes one or more instructions for providing one or more custom Non-Standard H.245 messages or custom Non-Standard fields in standard messages. The one or more custom H.245 messages or custom Non-Standard fields are associated with one or more set up parameters for an initial predetermined mode of operation. Moreover, the computer-readable medium includes one or more instructions for transmitting the one or more custom Non-Standard H.245 messages or custom Non-Standard fields in standard messages from the first terminal to the second terminal, one or more instructions for transmitting a custom Non-Standard response message associated with the one or more custom Non-Standard H.245 messages or custom Non-Standard fields from the second terminal to the first terminal, and one or more instructions for processing the one or more custom H.245 messages or custom Non-Standard fields during a predetermined time period. Also, the computer-readable medium includes one or more instructions for establishing the initial predetermined mode of operation between the first terminal and the second terminal through the bearer channel based upon at least one or more of the custom H.245 messages or custom Non-Standard fields.

Type III: Speed-Up by Incorporation of Equipment Preferences in Call Signaling Phase A third method for reducing call set up times for H.324 terminals proposes passing information during the call signaling phase (bearer establishment) where it is possible to embed user-defined information into the bearer establishment protocol. This method allows an H.324-like calling equipment to specify equipment preferences in terms of media communication and the underlying configurations for the multiplexer and the logical channels. There are a number of ways to represent such preferences including preference codes (numeric or alpha-numeric string representing pre-defined preference configuration) and explicit preferences expressed in a format such as the ITU-T Abstract Syntax Notation (ASN.1) format. We call these preferences (coded or explicit) profiles. In the case of explicit preferences or profile, a list of profiles can be transmitted as part of the bearer setup signal or message. A profile (coded or explicit) specifies exact values for the all aspects of the multiplexer and H.245 channels necessary to set up a call. For example, the Mobile Level, Master Slave Determination, media formats for each logical channel and the multiplexer table entries for each logical channel must be defined. The answering equipment then selects the profiles to use in user-defined information embedded in the bearer establishment (call signaling) signal or message. This allows the terminals to exchange the parameters of the H.245 channel at the time the called equipment accepts the call, rather than requiring multiple round trips after the call is accepted.

The bearer establishment (call signaling) is typically specific to the network where the H.324-like equipment is being used. In the context of 3G-324M, the call signaling uses an ITU-T Q.931-like call signaling protocol that allows the incorporation of the preference information messages. The Q.931 allows for the incorporation of user-defined information in the protocol messages. Q.931 signaling can be complex, but for the purpose of our description here it can be simplified to two messages. A "Setup" Q.931 message containing the calling party information and other parameter is transmitted from the calling equipment to the called terminal. The called terminal will respond with a "Connect" message to answer the call (e.g. user pressed the answer button). In this context the H.324-like equipment preferences are incorporated in the "Setup" message transmitted by the calling equipment. As mentioned earlier the preference messages can be incorporated in the user defined part of the Q.931 message. When the called terminal answers the call by transmitting the "Connect" Q.931 message, it incorporates its preferred mode of operation in the user defined field of its "Connect" response message. The Setup and Connect messages are described further in the ITU-T Q.931 Recommendation and in the 3GPP technical specification documents. Note that the 3GPP2 equivalent documents exist for the CDMA counterpart of the WCDMA 3GPP.

In the case of ISDN networks (e.g. H.324 over ISDN) and networks signaled using SS7 protocols, a configuration similar to that described above for 3GPP can be used.

In the case of GSTN networks, the call signaling protocols such as V.8, and V.8bis can be augmented to incorporate III preference codes.

Ability to utilize coded or explicit preferences overcome some limitations that call signaling protocols may have on the amount of user-defined information that can be included in their messages or signals.

Preferably, the present invention provides a method of initiating a call between users with reduced call set-up times using one or more telecommunication networks. The method includes providing one or more preferences for a call associated with a first terminal (e.g., handset, gateway, and other equipment) and a second terminal (e.g., handset, gateway, and other equipment). The one or more preferences are associated with an initial mode of operation for the call between the first terminal and the second terminal. The method also includes processing the one or more preferences as a Custom Message (e.g., user defined based upon preferences) and embedding the Custom Message in a predetermined field of a call initiation message. The method transfers the Custom Message from the first terminal to the second terminal through a telecommunication network using call signaling and processes the Custom Message by the second terminal. The method includes transferring a Custom Response Message by the second terminal using a call signaling response message to indicate to the first terminal the initial mode of operation and exchanging information between the first terminal and the second terminal after the initial mode of operation has been established.

Note that this method of incorporating equipment preference modes of operation in the call signaling is particularly efficacious when used in conjunction with H.323 fast connect in the context of an H.324/H.323 gateway that mediates calls between H.324-like and H.323-like equipment, respectively. It is similarly efficacious when used in the context of an H.324/SIP gateway that mediates calls between H.324-like and SIP equipment.

According to another embodiment, the present invention provides a computer-readable medium including instructions for initiating a call between users with reduced call set-up times using one or more telecommunication networks. The computer-readable medium is provided between at least a pair of H.324-like terminals coupled to the one or more telecommunication networks. The computer-readable medium includes one or more instructions for providing one or more preferences for a call associated with a first terminal and a second terminal. The one or more preferences are associated with an initial mode of operation for the call between the first terminal and the second terminal. Additionally, the computer-readable medium includes one or more instructions for processing the one or more preferences as a Custom Message, one or more instructions for embedding the Custom Message in a predetermined field of a call initiation message, and one or more instructions for transferring the Custom Message from the first terminal to the second terminal through a telecommunication network using call signaling. Moreover, the computer-readable medium includes one or more instructions for processing the Custom Message by the second terminal, one or more instructions for transferring a Custom Response Message by the second terminal using a call signaling response message to indicate to the first terminal the initial mode of operation, and one or more instructions for exchanging information between the first terminal and the second terminal after the initial mode of operation has been established.

The objects, features, and advantages of the present invention, which to the best of our knowledge are novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE DRAWINGS

FIG. 6 illustrates an embodiment of the ASN.1 Syntax description for Type II Request;

FIG. 7 illustrates an embodiment of the ASN.1 Syntax description for Type II Response;

FIG. 8 illustrates an embodiment of the ASN.1 Syntax description for Type III Request;

FIG. 9 illustrates an embodiment of the ASN.1 Syntax description for Type III Response;

FIG. 10 illustrates an embodiment of some coded Profiles, and their description, that can be used in Type III Request and Response.

DETAILED DESCRIPTION OF THE INVENTION

According to the present invention, techniques for telecommunications are provided. More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to (i) a method and apparatus for concatenating the H.245 messages that are required to pass between the terminals at the start of the call to establish the capabilities of both terminals and agree on the type and format of media and data to be exchanged (ii) a method and apparatus for using non-standard H.245 messages to accelerate such establishment and (iii) a method and apparatus of informing each terminal of the capabilities of the other and proposing the type and format of media and data to be exchanged by means of any user-defined fields that are inserted in the call signaling protocol that is used for bearer establishment prior to the start of the H.324 stage of the call. These methods may be used separately or severally to reduce the time that is taken from the point when a user requests the establishment of a call to the point where media starts to be exchanged between the terminals. Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

The methods described above are generic and can be implemented in many different ways by a person skilled with the field. We describe below example embodiments to illustrate the methods which can be adapted easily to suite specific equipment needs.

TYPE I EXAMPLE EMBODIMENT

Figure 1A:
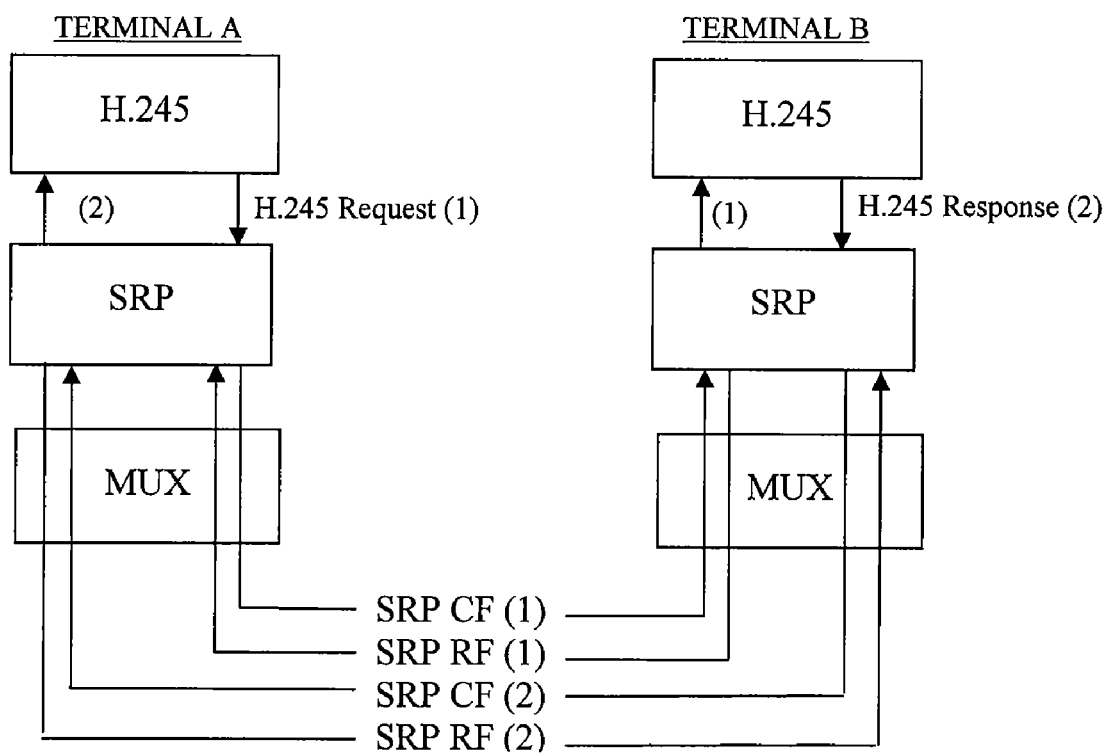
FIG. 1A is a diagram useful in illustrating the communications that flow between two H.324 terminals when an H.245 Request message is sent from one terminal to the other.
Figure 1B:
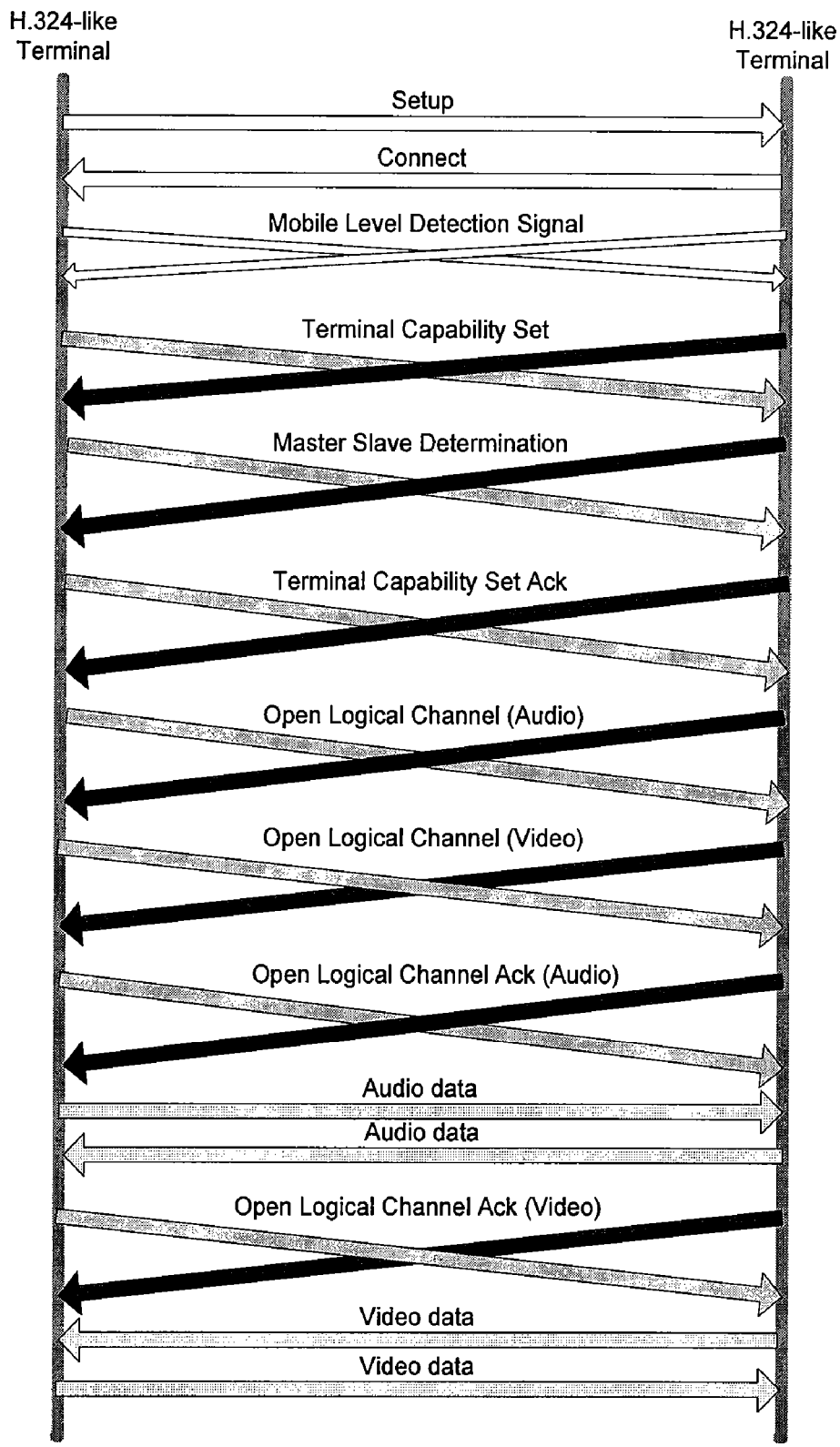
FIG. 1B illustrates session Set-up for a call between H.324-like equipment. Note in this case unidirectional video channels are used (e.g. video over adaptation layer AL2 of the H.223 multiplexer).
Figure 2:
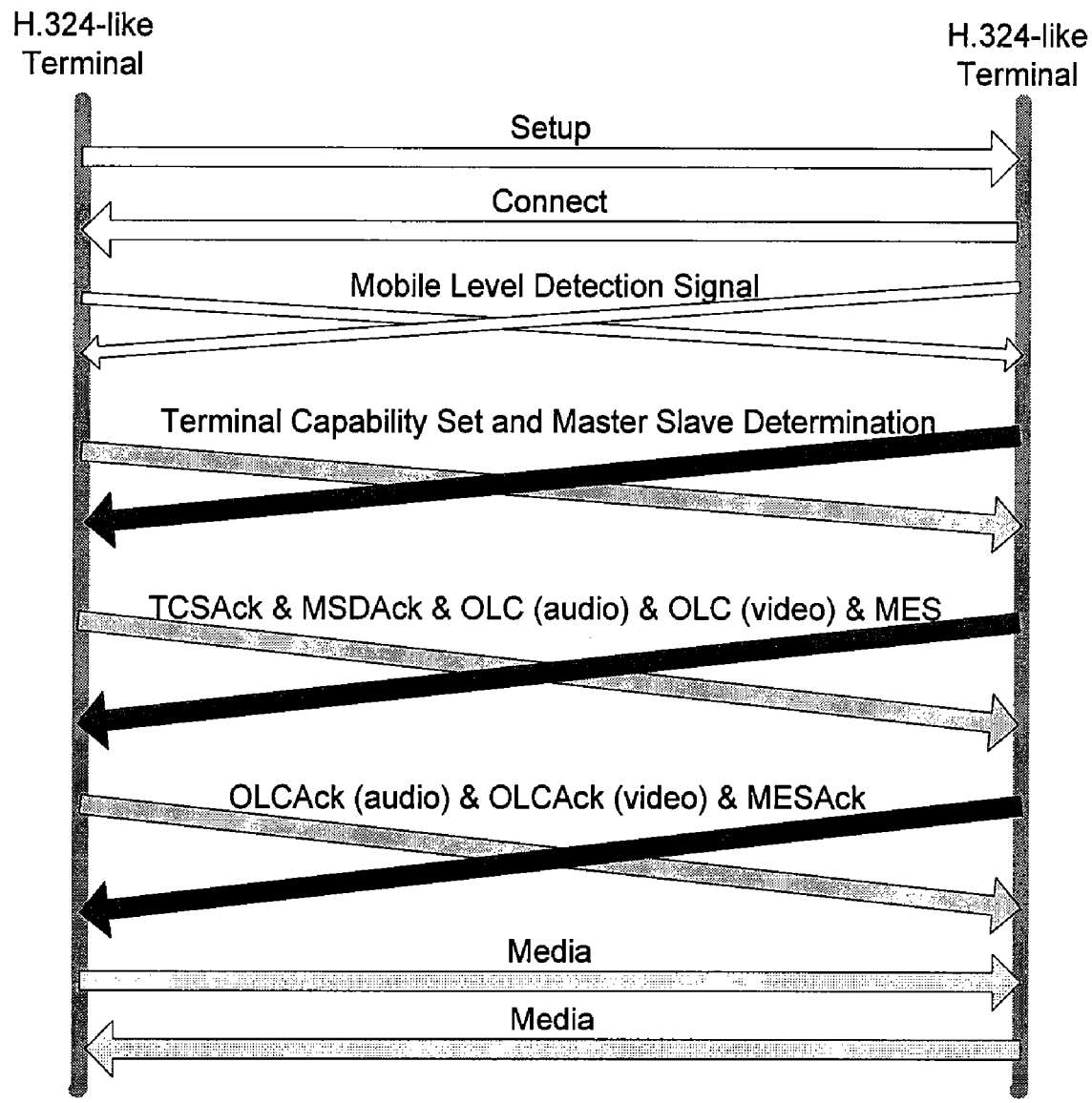
FIG. 2 illustrates an embodiment of the method of using concatenated H.245 between two H.324 terminals to reduce connection times for H.324 calls.

In a particular embodiment of this method of concatenated H.245 messages a terminal combines H.245 Request Terminal Capabilities (TCS) and Request Master Slave Determination (MSD) messages into a single H.245 PDU. It also concatenates TCS and MSD Response Messages (Acks), multiple Open Logical Channel Requests (OLC) and Multiplex Table Entry Send Request (MES) in a single H.245 PDU. Finally it combines OLC and MES responses into a third H.245 PDU. The process of setting up an H.324 call between two terminals which support this embodiment of the concatenation method is illustrated in FIG. 2. The result of adopting this approach reduces the number of round trips required for call setup from around ten to three. This embodiment requires that the MSDSE and CESE state machines can run in parallel, and that the multiple LCSE and MTSE state machines can run in parallel. This embodiment is merely one example of the application of the method of concatenated H.245 messages in the present invention; other concatenations of messages can be constructed; these may put different constraints on the signaling entity state machines within the implementation of H.245.

Optionally, the method also includes reverting to a normal operation if one of the terminals does not support Type I (i.e. concatenated H.245 messages). The calling terminal in this case detects that because it would not have received the H.245 response to the second of the concatenated H.245 messages. In this case the calling terminal would revert to individual H.245 messages in the SRP command frames and retransmit the H.245 messages individually from the second message onwards. There can be many other variations, alternatives, and modifications.

Alternatively, the method can also be applied to the Numbered Simple Retransmission Protocol (numbered version of SRP which includes a sequence number in the SRP command and SRP acknowledgement frames) and other like variations. Of course, there can be other variations, modifications, and alternatives.

TYPE II EXAMPLE EMBODIMENT

In a particular embodiment of the method of using custom H.245 messages, a non-standard Capability is used. An H.324-like equipment requires that the first H.245 message it sends is a Terminal Capability Set (TCS) message. The calling equipment includes a capability of type NonStandardParameter in the TCS it sends to the answering equipment. This capability is identified by a NonStandardIdentifier with a unique Object Identifier. This capability contains the additional parameters needed by the called terminal to start the call, including terminalType (needed for MSD in the same manner as it is required for standard H.245 operation) and Multiple Table Entry (MTE) Descriptors. FIG. 6 shows an example of an ASN.1 description containing the syntax for all of these data. By including this NonStandard Capability, the calling party is required to accept the decision of the called party as to whether this method is used, and what channels are selected.

If the called equipment does not support this method the calling equipment receives a conventional TCSAck and normal H.245 negotiation is then used to continue the call set-up.

If a called terminal receives a TCS containing the NonStandard capability relating to this method and itself supports the method, it will perform a master slave determination by comparing the terminalType value in the received NonStandard capability with the value for the local terminal. The highest value will be selected as the master. In the event of equal terminal type values, the calling terminal will be selected as the master.

The called terminal will analyze the received capability table to determine the OpenLogicalChannel and multiplex table entries for the new connection. The called terminal will respond with a normal TCSAck if it cannot derive an acceptable channel configuration, or if it is unable to accept the multiplexEntryDescriptors provided. The remainder of the call set-up will then be via normal H.245 negotiation.

If acceptable channel configurations and multiplex table entries can be derived, the called party will replace the normal TCSAck with an H.245 ResponseMessage of the type NonStandardMessage. See FIG. 7 for an ASN.1 Syntax description of the encoded data. The NonStandardIdentifier of the non-standard response message will have the same Object Identifier as the NonStandard capability which identifies this method.

Note that the called terminal does not include any additional or NonStandard capabilities into the TCS it sends to the calling terminal, even if it supports this method. The calling terminal must wait to receive either a TCSAck or the NonStandardMessage before proceeding.

Figure 3:
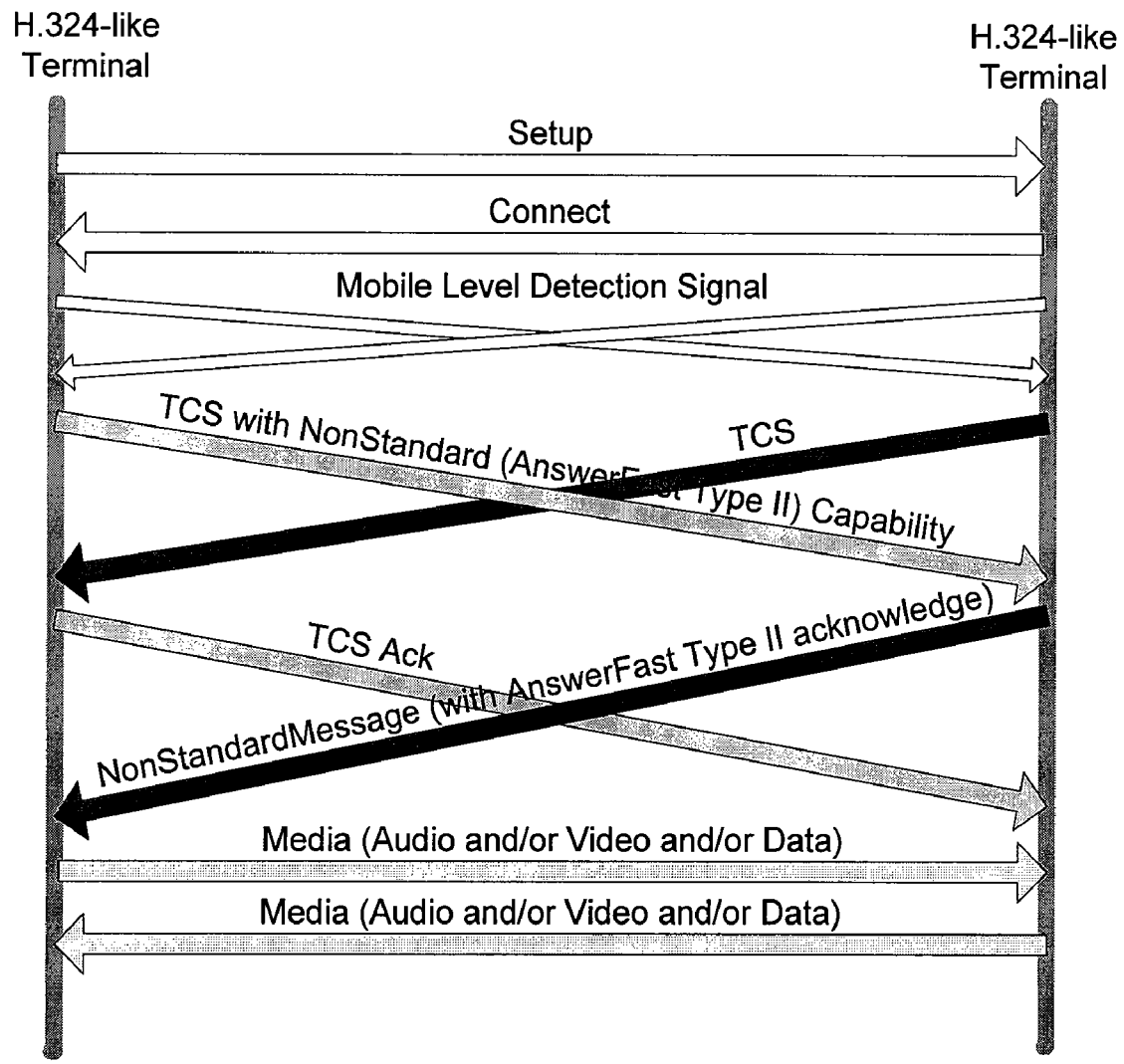
FIG. 3 illustrates an embodiment of the method of using non-standard extensions of H.245 messages to reduce connection times for H.324 calls.

The process of setting up an H.324 call between two terminals which support this embodiment of the method of using custom H.245 messages is illustrated in FIG. 3. This embodiment offers one and a half less round trip exchanges than the embodiment of the method of Concatenated H.245.

Capability expressed in the TerminalCapabilitySet request message. This ensures that the called terminal would not malfunction or hang-up as it is required to be able to handle the case of a non-standard Capability being communicated to it.

The second key aspect is that the encapsulation of the custom message in the TerminalCapabilitySet request message allows the terminal to transmit the custom message in the first H.245 message after the mobile level determination is done, and hence it does not have to wait.

The third aspect is that the TerminalCapabilitySet request containing the Type II message embedded as a non-standard Capability can be transmitted using the Type I mode (together with one or more H.245 messages).

The fourth aspect is that the called terminal responds with an Ack message that informs the calling terminal of the preferred modes of the called terminal and its selection of one of the preferred modes of the calling terminal if the calling terminal presented several preferences in its Type II message.

TYPE III EXAMPLE EMBODIMENT

In a particular embodiment of the method of using call signaling "user" information, Q.931 User-User Information Element is used in the SETUP and CONNECT PDUs. This Information Element is filled with an ASN.1 encoded structure (See FIG. 8) including terminalType (needed for MSD in the same manner as it is required for standard H.245 operation) and a list of profiles the calling terminal wishes to offer. By including this Information Element, the calling party is required to accept the decision of the called party as to whether this method is used, and what profile is selected.

Each profile dictates the Mobile Level, Multiplex Table Entries, Logical Channels used and codecs used for each Logical Channel. FIG. 10 illustrates some examples of profiles. The profile contains all the information required to immediately begin a call and establish media between the terminals without the need to go through further H.245 signaling after the bearer is set up.

If the called terminal does not support this method, the calling terminal receives a Q.931 CONNECT PDU without a User-User Information Element and normal call set-up is then used.

If a called terminal receives a SETUP PDU containing the User-User Information Element relating to this method and itself supports the method, it will perform a master slave determination by comparing the terminalType value in the received Information Element with the value for the local terminal. The highest value will be selected as the master. In the event of equal terminal type values, a technique such as selecting the calling terminal as the master can be used to resolve the conflict.

The called terminal will also select one of the offered profiles. If none of the offered profiles are suitable then no User-User Information Element should be added to the Q.931 CONNECT PDU, and the call proceeds as normal.

If a profile is suitable then the master slave determination result and the selected profile is encoded according to the ASN.1 Syntax for the response and added to the Q.931 CONNECT PDU as a User-User Information Element. FIG. 9 illustrates a particular embodiment.

Figure 4:
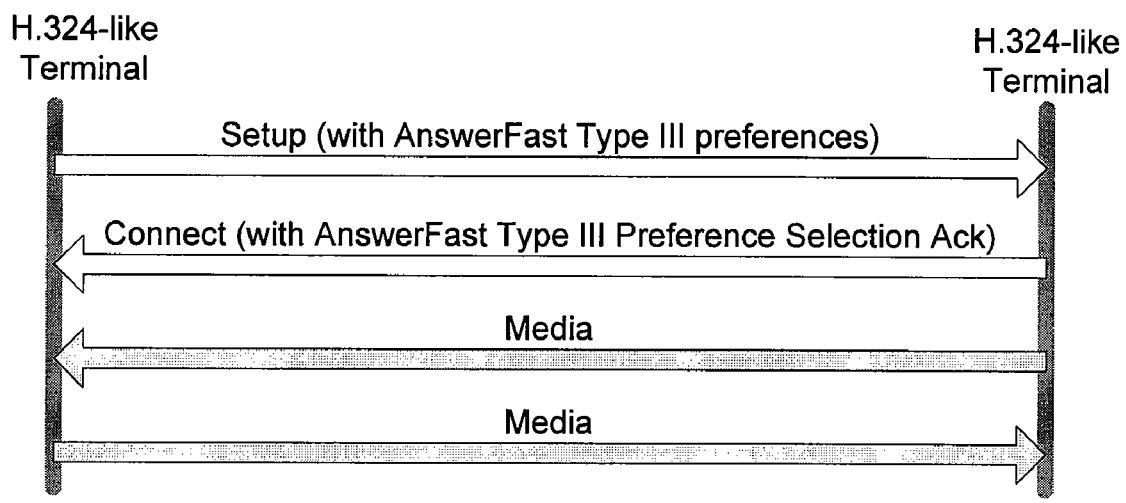
FIG. 4 illustrates an embodiment of the method of using bearer "user" information to reduce connection times for H.324 calls.

The process of setting up an H.324 call between two terminals which support this embodiment of the method of using call signaling "user" information is illustrated in FIG. 4.

Figure 5:
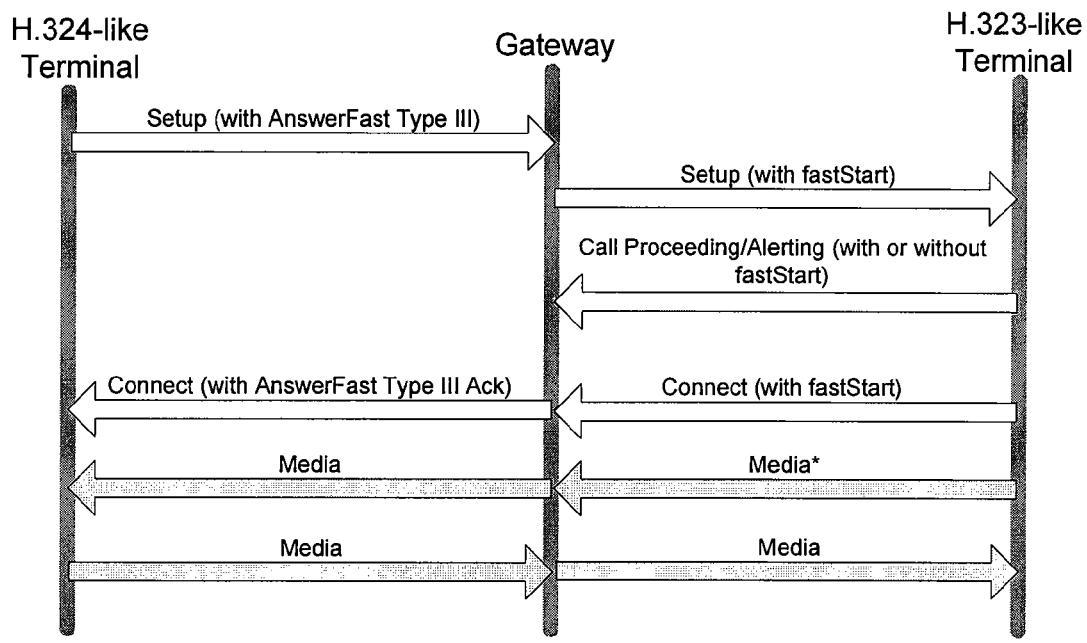
FIG. 5 illustrates an embodiment of the method of using bearer "user" information to reduce connection times for calls between an H.324 terminal and an H.323 terminal using a gateway.

Embodiment in the Context of a H.324/H.323 Gateway:

A further embodiment demonstrating use with a gateway to an H.323 terminal using "FastConnect" is illustrated by FIG. 5. These embodiments offer a maximum reduction in call set up time. These embodiments eliminate all round trip exchange for H.245 messages and, for the H.324 call segment, initial mobile level detection.

Embodiment in the Context of a H.324/SIP Gateway:

The embodiment in this context is similar to that of the H.324/H.323 gateway with the exception that the gateway converts the information (Type I, II and/or III) to SIP signaling messages.

Additionally, any terminal may support Type III and another terminal may support Type I/II. Both terminals should be able to operate at their common support type (i.e. in this case Type II) as if the calling terminal would not receive the Type III response in the call signaling phase. The general mode is that terminals fall back to the highest common mode and within that mode to the highest supported version. Of course, there may be variations, alternatives, and modifications.

H.324 SRP Extension

There is also scope to optimize H.324 SRP to support faster call setup, call tear-down and other session messaging (H.245 Messaging), in environments where network latency is significant. One of the features of H.324/H.245 is the use of SRP, which provides acknowledgement for all delivered PDUs. This is useful to ensure that all command and control messages have been received at the far end terminal, but provides a limit to the throughput of messages on networks with moderate to high latency (>40 ms round trip time).

SRP only allows for one message to be outstanding at any time to ensure guaranteed delivery and correct message sequencing. This latency can be mitigated to some extent by minimizing the number of messages exchanged during call setup such as a message containing multiple Multiplex Table Entries, or combining Terminal Capability Set and Master Slave determination messages, however it does still adversely impact the can setup time.

In addition timeouts are such within H.324/H.245 that if a critical packet (or its acknowledgement) is lost during call setup (perhaps due to data loss) the call may fail, and abort if timer values within stack implementations are not tuned appropriately.

All of these phases are necessary to remain standards compliant, but it may be the case that in some circumstances SRP may be used in such a way to allow messages to be sent while an SRP ACK is outstanding.

In many cases the H.324/H.245 procedures are artificially held back due to the behavior of H.245/SRP. Essentially independent procedures such as the opening of different logical channels are unnecessarily coupled by the requirement that only one H.245 SDU may be outstanding at any time. By removing this limitation for independent procedures it is estimated that the time to execute H.245 procedures could be reduced by between 50-100%.

Some SDUs must be preserved in strict order, for example with all procedures, or within a single instance of an Open Logical Channel procedure, however independent OLC requests do not need to be coupled as they are in the current standard.

In order to allow new SDUs to be transmitted while SRP ACKs are outstanding a means of identifying SRPs and associating them with the relevant message is required. One approach would be to use Numbered SRPs (NSRP). The alternatives to this scheme are based on a Selective ACK (SACKSRP), or a sliding window (WNSRP) scheme, as described below.

In order to minimize implementation complexity and maintain maximum consistency it is recommended that a sliding window scheme is used. This will allow the H.324/H.245 implementation to send a maximum of n SRP packets without corresponding ACKs being received. The H.245 implementation itself must maintain locking to ensure that only one SDU ACK is outstanding from each state machine instance (typically per H.245 procedure), otherwise message sequences within each state machine cannot be guaranteed.

In order to enable this behavior the H.324 entity must be able to signal to the far end that it is capable of handling this scheme. It is suggested that this be included with Terminal Capability Set, as is the case with NSRP, but a alternative header field would be required to specify the remote handling of this case. In the case where the fast connect scheme described above is used this will have no impact on call setup time, however it will improve speed and reliability for subsequent H.245 control operations.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, the functionality above may be combined or further separated, depending upon the embodiment. Certain features may also be added or removed. Additionally, the particular order of the features recited is not specifically required in certain embodiments, although may be important in others. The sequence of processes can be carried out in computer code and/or hardware depending upon the embodiment. Of course, one or ordinary skill in the art would recognize many other variations, modifications, and alternatives.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of transmitting H.245 messages with increased speed and reliability using a sliding window in a numbered simple retransmission protocol (WNSRP) which allows reduction of a number of sequential round-trips by parallelization of one or more WNSRP frames, the method being provided between at least a pair of H.324 devices, the method comprising:
   providing a control channel between the first device and the second device;
   determining a mobile level for operation; and
   performing two or more transmitting processes within a round trip cycle time using the first device, wherein the two or more transmitting processes include at least a first WNSRP command frame characterized by a first content and associated with a first WNSRP response frame and at least a second WNSRP command frame characterized by a second content and associated with a second WNSRP response frame, the two or more transmitting processes comprising:
      transmitting the first WNSRP command frame from the first device to the second device through the control channel; and
      transmitting the second WNSRP command frame from the first device to the second device through the control channel prior to receiving the first WNSRP response frame from the second device in response to the first WNSRP command frame.

2. The method of claim 1 further comprising performing an additional transmitting process comprising transmitting a number of additional WNSRP command frames from the first device to the second device through the control channel prior to receiving the first WNSRP response frame from the second device in response to the first WNSRP command frame.

3. The method of claim 2 wherein the number of additional WNSRP command frames is less than or equal to a predetermined maximum number of unacknowledged WNSRP command frames.

4. The method of claim 1 further comprising:
   receiving the first WNSRP response frame transmitted from the second device in response to the first WNSRP command frame; and
   determining that a sequence number present in the first WNSRP command frame is present in the first WNSRP response frame; and
   determining, at the first device, that the WNSRP response frame is an acknowledgment of the first WNSRP command frame based on the sequence number.

5. The method of claim 1 wherein the first content is different from the second content.

6. The method of claim 1 wherein the first WNSRP response frame is different from the second WNSRP response frame.

7. The method of claim 1 further comprising transmitting a third WNSRP command frame characterized by a third content and associated with a third WNSRP response frame from the first device to the second device after receiving the first WNSRP response frame.

8. The method of claim 7 wherein the third WNSRP command frame is an nth WNSRP command frame that is transmitted n−1 WNSRP command frames after the first WNSRP command frame.

9. The method of claim 1 further comprising:
   determining that the first WNSRP response frame is not received at the first device within a predetermined time period; and
   retransmitting the first WNSRP command frame from the first device to the second device.

10. The method of claim 9 wherein the predetermined time period is associated with a standard timer.

11. The method of claim 1 further comprising:
   receiving the second WNSRP response frame;
   determining that at least the first WNSRP response frame has not been received; and
   retransmitting at least the first WNSRP command frame from the first device to the second device.

12. The method of claim 1 further comprising:
   receiving a third WNSRP command frame transmitted from the second device to the first device; and
   determining a capability associated with the second device based on receiving the third WNSRP command frame.

13. The method of claim 12 wherein determining a capability comprises determining an alternative header is used in the first WNSRP command frame.

14. The method of claim 13 wherein the alternative header is an alternative to an SRP command frame header used in a standard SRP command frame.

15. The method of claim 1 further comprising repeating a transmission of the first WNSRP command frame from the first device to the second device through the control channel, thereby improving reliability against channel errors.

16. The method of claim 1 wherein the first WNSRP command frame is associated with a first state machine and the second WNSRP command frame is associated with a second state machine different from the first state machine.

17. The method of claim 16 further comprising delaying transmission of an additional WNSRP command frame until the first WNSRP response frame is received in response to the first WNSRP command frame, wherein the additional WNSRP command frame is associated with the first state machine but characterized by different content than the first WNSRP command frame.

18. The method of claim 1 further comprising delaying transmission of an additional WNSRP command frame until the first WNSRP response frame is received in response to the first WNSRP command frame, wherein:
the first content is a first logical channel message associated with a first logical channel number,
the second content is a second logical channel message associated with a second logical channel number, and
the additional WNSRP command frame is characterized by a third content associated with the first logical channel number, wherein the third content is different from the first content.

19. The method of claim 18 wherein the first logical channel message comprises an open logical channel message.

20. The method of claim 18 wherein the first logical channel number is different than the second logical channel number.

21. The method of claim 1 wherein the first WNSRP command frame contains some portion of an H.245 Terminal Capability Set message and an H.245 Master Slave Determination message.

22. The method of claim 1 wherein:
the first WNSRP command frame contains some portion of an H.245 Terminal Capability Set message; and
the second WNSRP command frame contains some portion of an H.245 Master Slave Determination message.

23. The method of claim 1 wherein the first device comprises a 3G-324M device and the second device comprises a 3G-324M device.

24. The method of claim 1 wherein the first device comprises at least one of an H.324 server or an H.324 gateway.

25. The method of claim 1 wherein the first device comprises an H.324 gateway connected to a non-H.324 device.

26. The method of claim 25 wherein the non-H.324 device comprises a packet device.

27. The method of claim 25 wherein the non-H.324 device comprises at least one of an H.320 device, an H.323 device, a SIP device, or an RTSP device.

28. The method of claim 1 wherein the first device comprises an H.324 gateway connected to an H.324 device over a circuit-switched network.

29. The method of claim 1 wherein the first device comprises an H.324 gateway connected to an H.324 device over a packet-switched network.

30. The method of claim 1 wherein the first WNSRP command frame is stored at the first device until the first WNSRP response frame acknowledges that the first WNSRP command frame is received.

31. The method of claim 1 wherein the first WNSRP command frame and one or more additional WNSRP command frames are stored at the first device until the first WNSRP response frame acknowledges that the first WNSRP command frame is received.

32. The method of claim 1 wherein the first WNSRP command frame comprises a sequence number and the first WNSRP response frame comprises the sequence number, wherein the sequence number identifies an association of the first WNSRP command frame with the first WNSRP response frame.

33. A method of receiving H.245 messages with increased speed and reliability using a sliding window in a numbered simple retransmission protocol (WNSRP), the method being provided between at least a pair of H.324 devices, the method comprising:
providing a control channel between the first device and the second device;
determining a mobile level for operation; and
performing two or more receiving processes within a round trip cycle time using the first device, wherein the two or more receiving processes include at least a first WNSRP command frame characterized by a first content and associated with a first WNSRP response frame and at least a second WNSRP command frame characterized by a second content and associated with a second WNSRP response frame, the two or more receiving processes comprising:
receiving the first WNSRP command frame transmitted from the second device to the first device through the control channel;
transmitting the first WNSRP response frame;
receiving the second WNSRP command frame transmitted from the second device to the first device through the control channel in a period less than a round trip time after the first WNSRP command frame is received; and
transmitting the second WNSRP response frame.

34. The method of claim 33 further comprising determining a capability associated with the second device based on receiving the first WNSRP command frame.

35. The method of claim 34 wherein determining a capability comprises determining an alternative header is used in the first WNSRP command frame, the alternative header being an alternative to an SRP command frame header used in a standard SRP command frame.

36. The method of claim 33 wherein the period less than a round trip time is a period less than half a round trip time.

37. The method of claim 33 wherein the first WNSRP command frame and the second WNSRP command frame are different.

38. The method of claim 33 wherein the first device comprises a 3G-324M device and the second device comprises a 3G-324M device.

39. The method of claim 33 wherein the first device comprises at least one of an H.324 server or an H.324 gateway.

40. A method of receiving a capability for using a sliding window in a numbered simple retransmission protocol (WNSRP), the method being provided between at least a pair of H.324 devices, the method comprising:
providing a control channel between the first device and the second device;
determining a mobile level for operation; and
receiving a WNSRP command frame transmitted from the second device to the first device through the control channel;
determining a capability associated with the second device based on the WNSRP command frame, the capability being related to a process for using sequence numbers for transmitting a window of SRP command frames.

41. The method of claim 40 further comprising:
receiving a second WNSRP command frame transmitted from the second device to the first device through the control channel in a time period less than a round trip time after receiving the WNSRP command frame.

42. The method of claim 40 wherein determining a capability comprises determining an alternative header is used in the WNSRP command frame, the alternative header being an alternative to an SRP command frame header used in a standard SRP command frame.

43. The method of claim 40 wherein:
the WNSRP command frame comprises an alternative header; and
upon receipt of the WNSRP command frame, the first device acknowledges the WNSRP command frame by transmitting a WNSRP response frame to the second device.

44. The method of claim 43 wherein the WNSRP command frame comprises a sequence number and the WNSRP response frame comprises the sequence number, wherein the sequence number identifies an association of the WNSRP command frame with the WNSRP response frame.

45. The method of claim 40 further comprising
transmitting a second WNSRP command frame from the first device to the second device through the control channel; and
transmitting a third WNSRP command frame from the first device to the second device through the control channel prior to receiving a second WNSRP response frame from the second device in response to the second WNSRP command frame.

46. The method of claim 40 wherein the first device comprises a 3G-324M device and the second device comprises a 3G-324M device.

47. The method of claim 40 wherein the first device comprises at least one of an H.324 server or an H.324 gateway.

* * * * *